United States Patent [19]
Fitzgerald et al.

[11] Patent Number: 5,644,693
[45] Date of Patent: Jul. 1, 1997

[54] INSTRUCTIONAL METHOD INVOLVING TALKING MATERIAL SAFETY DATA SHEET

[75] Inventors: Andrianne H. Fitzgerald, Shrewsbury; Edward Boyajian, Acton, both of Mass.

[73] Assignee: The Butcher Polish Company, Marlborough, Mass.

[21] Appl. No.: 346,469

[22] Filed: Nov. 29, 1994

[51] Int. Cl.$^6$ .................................................. G06F 3/00
[52] U.S. Cl. ...................... 395/326; 395/348; 434/308; 434/317; 434/219
[58] Field of Search .......................... 395/161, 155; 434/308, 317, 219

[56] References Cited

U.S. PATENT DOCUMENTS

| | | | |
|---|---|---|---|
| 4,855,725 | 8/1989 | Fernandez | 434/308 X |
| 5,030,101 | 7/1991 | Ikemoto et al. | 434/157 |
| 5,065,317 | 11/1991 | Hiramatsu et al. | 364/419 |
| 5,145,377 | 9/1992 | Tarvin et al. | 434/219 |
| 5,167,508 | 12/1992 | McTaggart | 434/317 |
| 5,180,307 | 1/1993 | Hiramatsu | 434/157 |
| 5,210,689 | 5/1993 | Baker et al. | 364/419 |
| 5,286,205 | 2/1994 | Inouye et al. | 434/157 |
| 5,305,206 | 4/1994 | Inoue et al. | 364/419 |
| 5,312,257 | 5/1994 | Tarvin et al. | 434/219 |
| 5,413,486 | 5/1995 | Burrows et al. | 434/317 |
| 5,454,722 | 10/1995 | Holland et al. | 434/271 |
| 5,463,724 | 10/1995 | Anderson et al. | 395/148 |
| 5,466,158 | 11/1995 | Smith, III | 434/317 |
| 5,542,040 | 7/1996 | Chang et al. | 395/155 |

OTHER PUBLICATIONS

American National Standards, ANSI Z400.1–1993, 8 pages, including "Foreword"; Published by American National Standards Institute, 1993.

The Marcom Group Ltd., National Education Training Group, Inc., 1993, pp. 211–213.

ITC, *Interactive Innovation from ITC*, undated, but appears to be 1993, the pages submitted are unnumbered and are from attachments to this book.

*Primary Examiner*—Mark R. Powell
*Assistant Examiner*—A. Katbab
*Attorney, Agent, or Firm*—Robert L. Goldberg

[57] ABSTRACT

The instructional method of the present invention demonstrates each portion of a Material Safety Data Sheet (MSDS) to the user, using a multimedia equipped computer, in an interactive manner. The MSDS is displayed on the screen and the user can use the mouse, for example, to click onto various portions of the displayed MSDS. Once the user has clicked onto an MSDS portion, the multimedia computer presents the user with an instructional demonstration, using, for example, spoken word, computer graphics, photographs and video, of the information contained in that portion of the MSDS.

11 Claims, 10 Drawing Sheets

INSTRUCTIONAL METHOD INVOLVING TALKING MATERIAL SAFETY DATA SHEET

Field of the Invention

The present invention relates to a method of instructing users of chemical products, such as cleaning or floor polishing products, of safety information related to such products. Specifically, the invention relates to instructing such users in an efficient manner, even if such users are unfamiliar with the English language or have difficulty comprehending such sometimes complicated and technical safety information.

Background of the Invention

Federal law requires that manufacturers of chemical products, such as cleaning or floor polishing products, produce a printed Material Safety Data Sheet (MSDS) explaining the health and safety aspects of their product. The American National Standards Institute (ANSI) has also recently established a standard for such MSDS's so that users will always expect to find the same type of information in the same place on an MSDS, no matter what product is involved.

An example of a printed MSDS is shown in Tables 1 and 2. As shown in Tables 1 and 2, various areas of the MSDS are assigned for designating certain information about the product.

TABLE 1

| MATERIAL SAFETY DATA SHEET | | | | |
|---|---|---|---|---|
| Manufacturer's Name | : | The Butcher Company ① | HMIS Rating ③ | |
| Address | : | 120 Bartlett Street | Health | 3 |
| | | Marlborough, MA 01752-3013 | Flammability | 0 |
| Telephone Number | : | (508) 481-5700 | Reactivity | 0 |
| Emergency Telephone | : | (800) 228-5635 Ext. 118 ② | | |
| Prepared By | : | Bonita C. Patterson | | |
| Date Prepared | : | August, 1989 | | |
| Date Revised | : | May, 1993 | | |

| IDENTITY |
|---|
| Common Name BARE KNUCKLES Ultra Stripper ④ |

Proper Shipping Name; Hazard Class; Hazard ID No.; Packaging Group:
Corrosive Liquid; N.O.S. (contains sodium hydroxide), 8, UN1760, PG II

| INGREDIENT INFORMATION | | | |
|---|---|---|---|
| Principal Hazardous Component(s) | CAS No | | ⑤ Threshold Limit |
| Monoethanolamine | 141-43-5 | 10-15 | TLV/PEL: 3 ppm; STEL: 6 ppm |
| 2-Butoxy ethanol | 111-76-2 | 10-15 | TLV/PEL: 25 ppm Skin |
| Sodium dodecylbenzene sulfonate | 25155-30-0 | 1-2 | NE |
| Potassium hydroxide | 1310-58-3 | 1-3 | TLV: 2 mg/M3 Ceiling |

SARA Title III Section 313 and 40 CFR Part 372 Notification: 2-Butoxy ethanol is
subject to the reporting requirements of Section 313 of Title III of the Superfund
Amendments and Reauthorization Act of 1986 and 40 CFR Part 372 under the chemical
category Glycol Ethers.

| PHYSICAL & CHEMICAL CHARACTERISTICS | | |
|---|---|---|
| Boiling Point 212° F. | Specific Gravity 1.04 | Vapor Pressure ND |
| Percent Volatile by Volume 95 | Vapor Density ND | Evaporate Rate ND |
| Solubility in Water Complete | Appearance and Odor | Clear red liquid; ammonia odor |
| Flash Point >200° F. | Extinguisher Media NA | ⑥ |
| Special Fire Fighting Procedures | This product is not flammable | |
| Unusual Fire and Explosion Hazards | None known to The Butcher Company | |
| Stability Stable | Conditions to Avoid None known to The Butcher Company | |
| ND = Not Determined, NE = Not Established, NA = Not Applicable | | |

TABLE 2

BARE KNUCKLES Ultra Stripper

Incompatibility  Acids (e.g. muriatic), oxidizers (e.g. bleach), and nitrosating agents.
Hazardous Decomposition Products  Normal products of combustion  ⑦
Hazardous Polymerization  Will Not Occur
Conditions to Avoid  None known to the Butcher Company

HAZARD DATA

Signs and Symptoms of Exposure  Direct contact of product with eyes may cause burns. Contact with skin may cause irritation. If ingested, product may cause burns to mouth, throat and stomach. Inhalation of vapor may irritate respiratory tract. High vapor concentrations may cause headache, dizziness and nausea. Pre-existing eye, skin, and respiratory disorders may be aggravated.
Chemicals Listed as Carcinogens or Potential Carcinogens  None  ⑧
Emergency and First Aid Procedures
1. Inhalation  Remove to fresh air. Call a physician if symptoms persist.
2. Eyes  Flush with water for at least 15 minutes. Seek immediate medical attention.
3. Skin  Flush with water. Call a physician if irritation develops.
4. Ingestion  Drink large quantities of water. Do not induce vomiting. Seek immediate medical attention.

SPECIAL PROTECTION INFORMATION

Respiratory Protection  None required if good ventilation is maintained.
Protective Gloves  Where skin contact is possible, wear rubber or other impervious gloves.  ⑨
Eye Protection  Where eye contact may occur, wear chemical splash goggles and/or face shield.

SPECIAL PRECAUTIONS AND SPILL/LEAK PROCEDURES

Handling and Storage  Use good personel hygiene practice. Wash contaminated clothing and equipment before reuse.  ⑩
Release or Spill  Before attempting clean-up, refer to Hazard data above. Contain spill. Use mop, absorbent, or wet vacuum to collect material for proper disposal. Rinse area with water.
Waste Disposal  Treatment storage, transportation, and disposal of this material must be in accordance with federal, state, and local regulations.

The information on this Data Sheet represents our current data and best opinion as to the proper use in handling of this product under normal conditions. Any use of the product which is not in conformance with this data sheet or which involves using the product in combination with any other product or any other process is the responsibility of the user.

As shown in Table 1, area ① designates the name, address and telephone number of the manufacturer. Area ② designates the emergency telephone number which the user or emergency response worker can call at anytime if an emergency occurs with respect to the product. Area ③ designates an HMIS (hazardous material identification system) rating in which the degree of hazard associated with the product can be quickly ascertained. Area ④ designates the common name of the product. Area ⑤ designates the chemical ingredients. Area ⑥ designates the physical and chemical characteristics (e.g., appearance and odor) of the product.

Table 2 shows the second page of an MSDS. Area ⑦ designates reactivity data concerning how the product will react when exposed to external products. Area ⑧ designates hazard data such as emergency and first aid procedures which should be followed in case of an accident. Area ⑨ designates special protection information such as whether protective gloves and/or eye protection should be used when using the product. Finally, area ⑩ designates special precautions and spill/leak procedures which should be followed.

The American National Standard applies to the preparation of an MSDS. It presents basic information on how to develop and write an MSDS. It identifies information that must be included to comply with the U.S. OSHA Hazard Communication Standard. It also identifies information that would be included for completeness, clarity, and format consistency. For example, every MSDS must list the physical and chemical characteristics of the product (shown in Table 1).

Much of the information contained in MSDS's can be quite technically complex and difficult to comprehend. This is especially true in the case of users who are not fully conversant in the English language (the language in which federal rules require the MSDS's to be written) or who may not have been educated through to the high school level. Thus, there is a need to make the important information contained in an MSDS known to all users of such chemical products regardless of their background.

One approach which has been taken in the prior art for educating such users involves using a multimedia computer system to present a linear demonstration, of the information contained in an MSDS. Each section of the MSDS, in series, is explained to the user during the demonstration. At the end of the demonstration, the user is given a test to determine how much of the demonstration has been retained. The test involves asking the user questions concerning the demonstration he/she previously viewed. The user answers the questions using the multimedia computer by clicking with a mouse onto certain sections of the monitor screen. The questions in the test and the demonstration itself are given, using the multimedia capabilities of the computer, through spoken word, cartoons, still photographic and moving video graphics using interactive video disc and soundcard technology included in a multimedia capable computer.

According to this approach, however, the instructional portion of the method, where the user is presented with a demonstration of the MSDS contents, takes place in a linear fashion similar to a film. That is, the time sequence of portions of the demonstration is predetermined by the creator of the demonstration and cannot be altered by the user. Thus, if a user has difficulty comprehending a certain aspect of the demonstration, the user must stop the demonstration and return back to the beginning and view the entire demonstration over again before returning to the portion that he/she wants to review.

Also, the above approach is disadvantageous because the user does not develop an intense familiarity with the various portions of an MSDS based on the location of each portion on the MSDS. Because the demonstration of the various parts of the MSDS proceeds in a linear fashion, the user is not forced to pay adequate attention to the demonstration since the user is not involved with the presentation sequence. Thus, if the user needs to use a new product which he/she has never used before, and the user is not near a multimedia computer, the user must study a printed MSDS and may not be intensely familiar with the various portions of the MSDS.

Accordingly, the teaching method according to the prior art multimedia system is inadequate for effectively and efficiently instructing users concerning the important health and safety information contained in an MSDS.

SUMMARY OF THE INVENTION

An object of the present invention is to present a method for instructing users of chemical products as to the contents of information contained in an MSDS, so that the users will be intensely familiar with the information content of the MSDS, independent of the user's background.

A further object of the present invention is to present such an instructional method in which a user is able to choose the presentation sequence of a multimedia MSDS demonstration so that the user will play an interactive role in the demonstration and thus be forced to pay more attention to the demonstration, and, in effect, become intensely familiar with the locational positioning of each item of information on the MSDS standard.

In order to attain the above objects, the instructional method of the present invention demonstrates each portion of the MSDS to the user, using a multimedia equipped computer, in an interactive manner. The MSDS is displayed on the screen and the user can use the mouse, for example, to click onto various portions of the displayed MSDS. Once the user has clicked onto an MSDS portion, the multimedia computer presents the user with an instructional demonstration, using, for example, spoken word, computer graphics, photographs and video, of the information contained in that portion of the MSDS.

DETAILED DESCRIPTION OF THE PREFERRED EMBODIMENTS

The preferred embodiments of the present invention will now be explained with reference to the Figures mentioned above.

The instructional method of the present invention is performed, in the preferred embodiment, using a personal computer with multimedia capabilities (i.e., CD-ROM drive, sound card and speakers). However, other hardware can be chosen and used by those of ordinary skill in the art.

Figure 1:
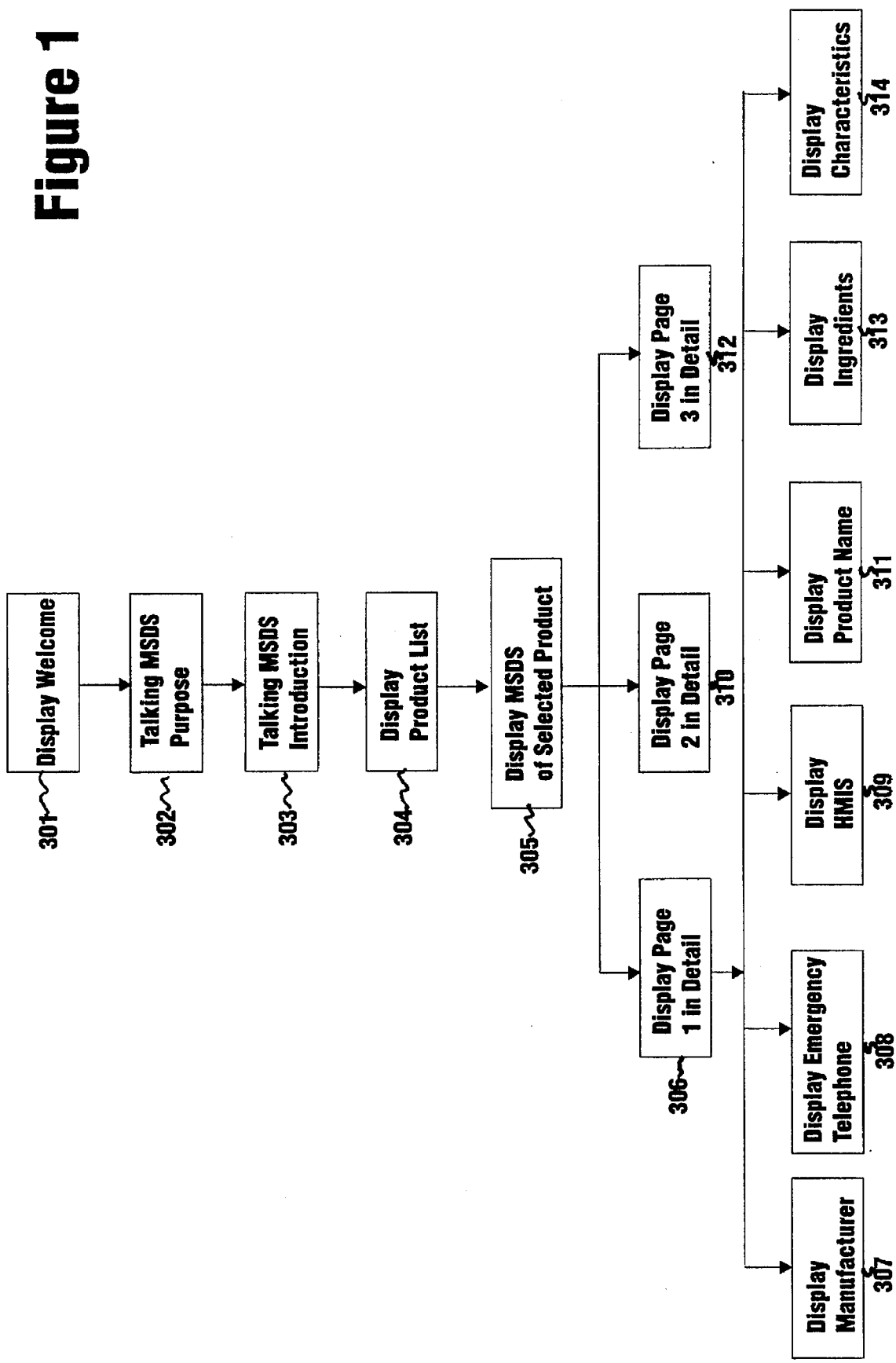
FIG. 1 shows a flowchart of the instructional method according to the present invention.
Figure 2:
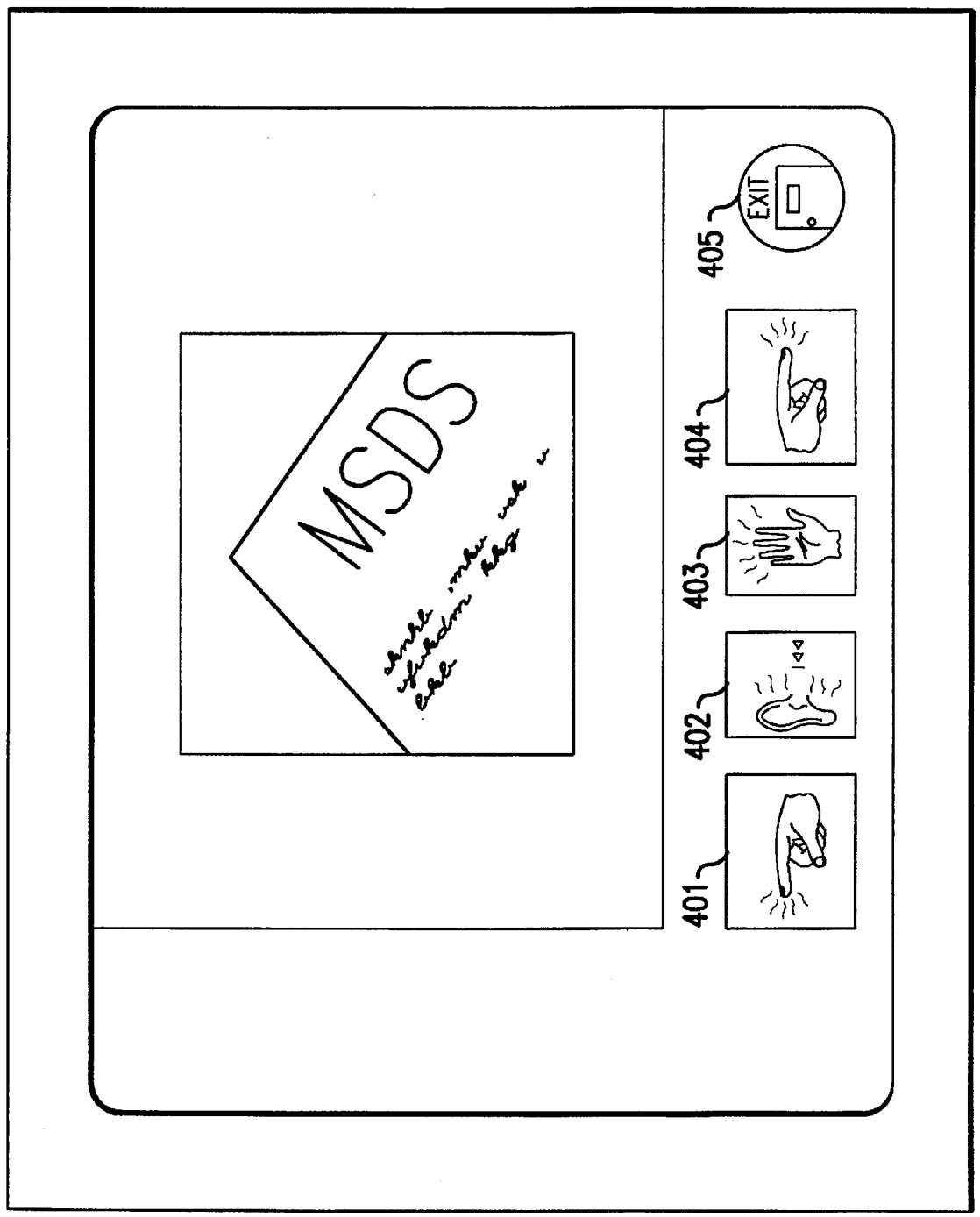
FIG. 2 shows a welcome screen.

A basic flowchart of operation of the instructional method of the present invention is shown in FIG. 1. FIGS. 2–10 show examples of various screens that are displayed to the user during the instructional method of the invention. FIG. 1 shows the basic structural time-ordering of these screens.

In each of FIGS. 2–10, graphical icons are displayed at the bottom of the screen to allow the user to control the system. That is, in FIG. 2, for example, icon 401 is used to command the display of a previous screen. Icon 404 is used to command the display of a next screen. Icon 402 is used to repeat the audio. Icon 403 is used to halt the progression (i.e., the audio will stop and the picture will freeze). Icon 405 is used to exit the program. The user uses the mouse, for example, to click on to the icons 401–405.

At the beginning of the instructional method, at step 301, a welcome screen (see FIG. 2) is displayed on the monitor and the words "Welcome to Butcher's Talking Material Safety Data Sheet, or MSDS" are output through the speakers.

Figure 3:
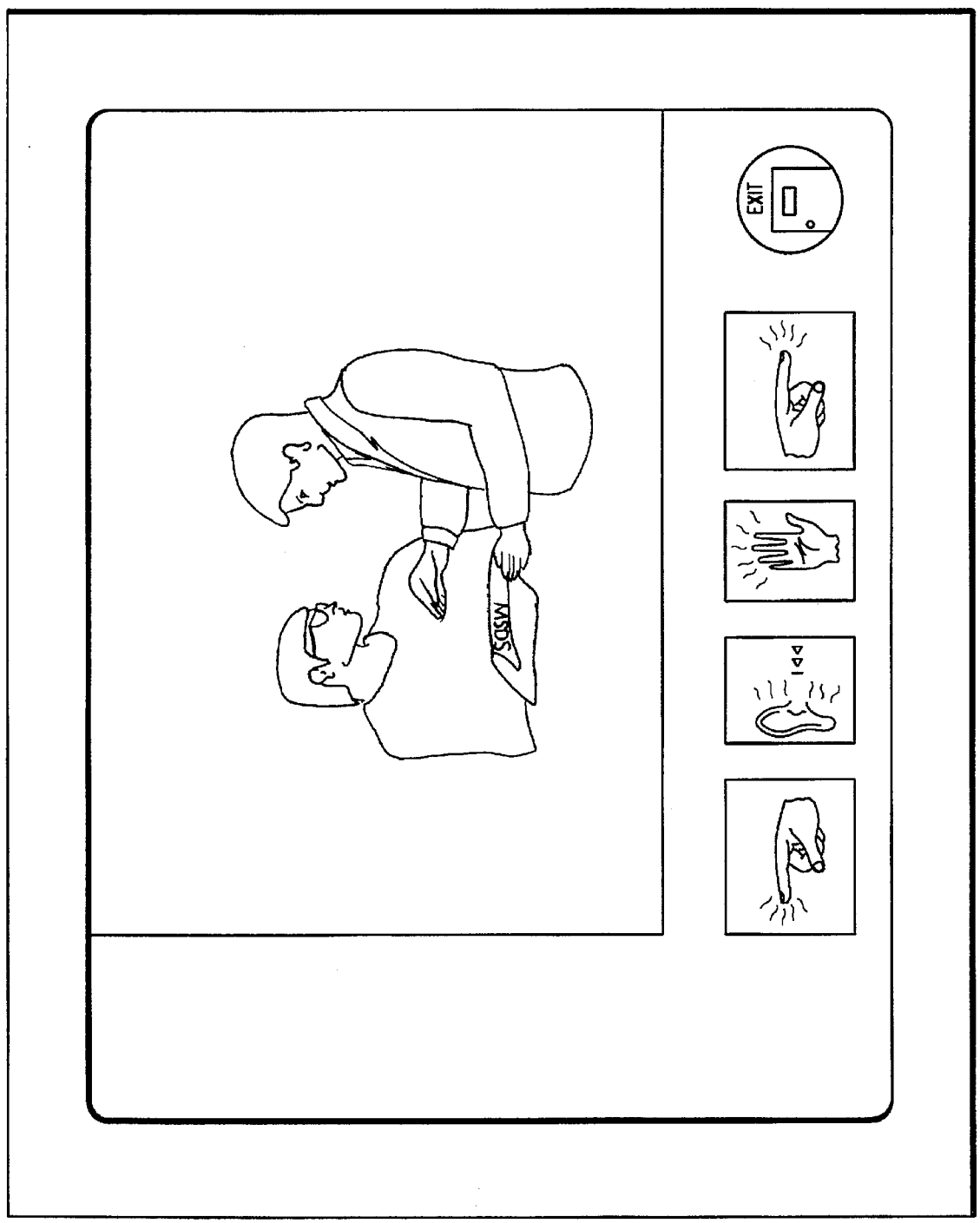
FIG. 3 shows an introductory screen.
Figure 4:
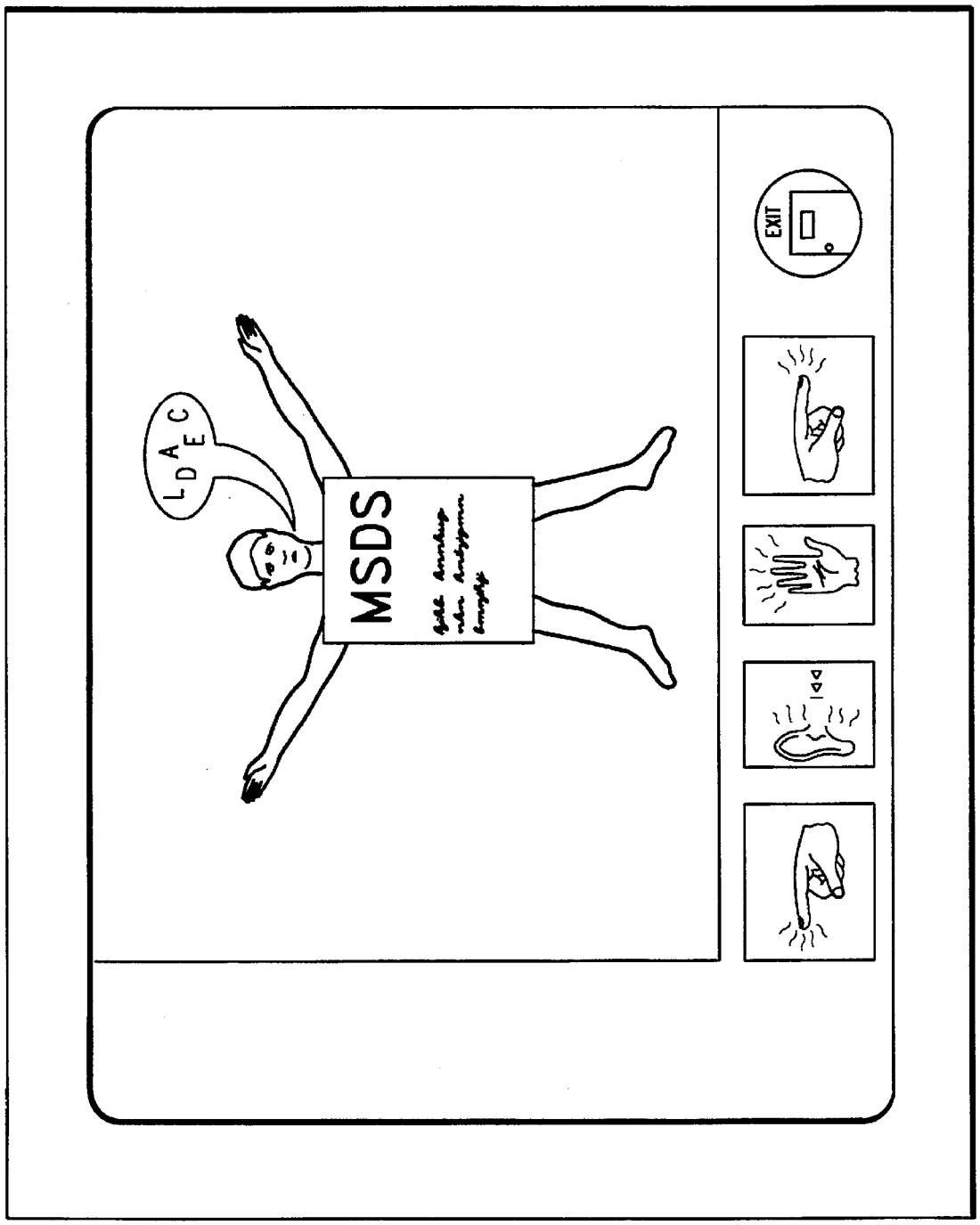
FIG. 4 shows an introductory screen.

At step 302, a picture as shown in FIG. 3 is displayed and the words "The purpose of an MSDS is to inform you of product hazards and the precautions you should take when working with the product. Traditionally, MSDS's are produced on paper, in English, with some technical terms" are output through the speakers.

At step 303, a comic illustration of a "Talking MSDS" is displayed (see FIG. 4) and the words "Butcher's Talking MSDS uses simple terms, pictures, multiple languages, and sound to give you all the safety information you need about a product" are output through the speakers.

At step 304, a list of products is displayed (see FIG. 5), in which the user can decide which of a plurality of products the user wishes to learn about. The words "Select the product you want to know about from the alphabetical list" are output through the speakers.

Figure 5:
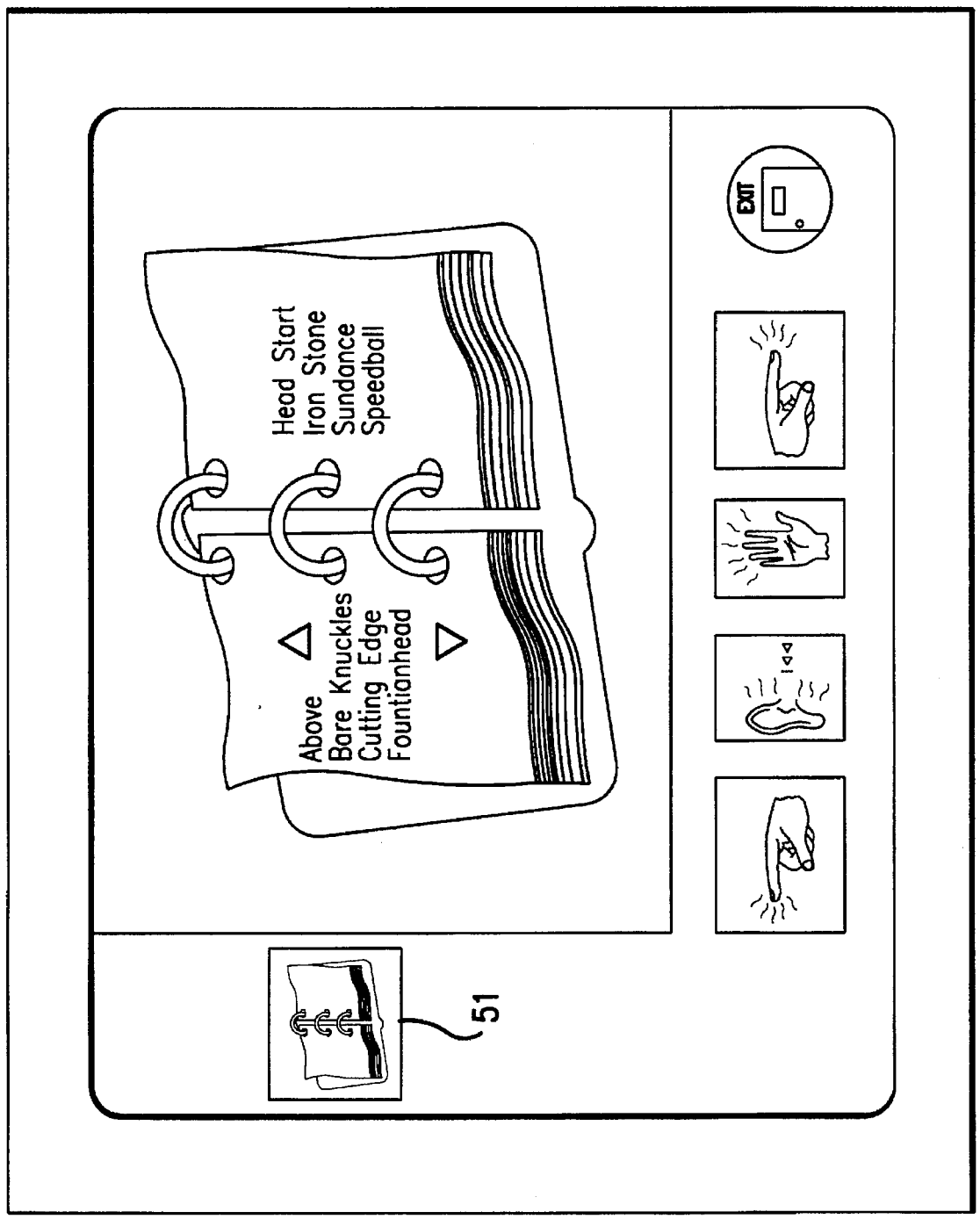
FIG. 5 shows a product list screen.

At any time during the lesson, the user can click on icon 51 of FIG. 5 in order to quickly return to the screen shown in FIG. 5 and select a different product.

At step 305, a picture of a 3-page MSDS is displayed (see FIG. 6) for the particular product chosen at step 304. If the MSDS for a particular product is longer, then other pages would be displayed. The words "You've selected Butcher's Bare Knuckles Ultra Stripper. Click on page 1 to get started" are output through the speakers. At this point, the user can choose which of the three pages he/she wishes to learn about in more detail. This provides for great flexibility in the user's control of the sequence of instruction. For example, if the user wants to specifically learn about information on page 2, he/she can quickly go to page 2 by clicking on the page 2 icon displayed on the screen. Note that icons 81, 82 and 83 are also provided on the left hand side of FIG. 6, and can also be used for quickly switching to a different page in a random access manner.

Figure 6:
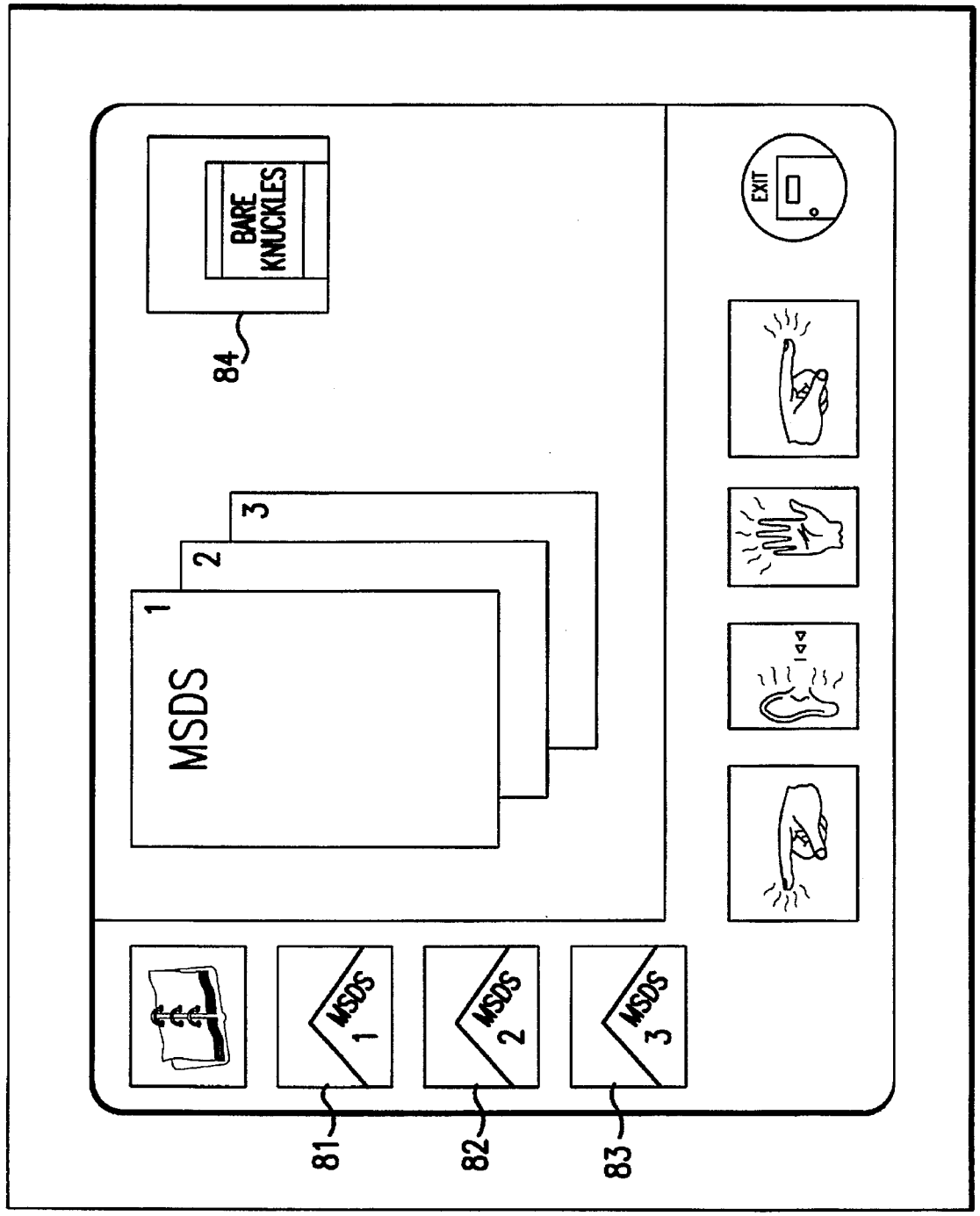
FIG. 6 shows a multi-page MSDS screen.

Also shown in FIG. 6 is an icon 84 which serves as a reminder to the user that the product he/she is learning about is called "Bare Knuckles".

Figure 7:
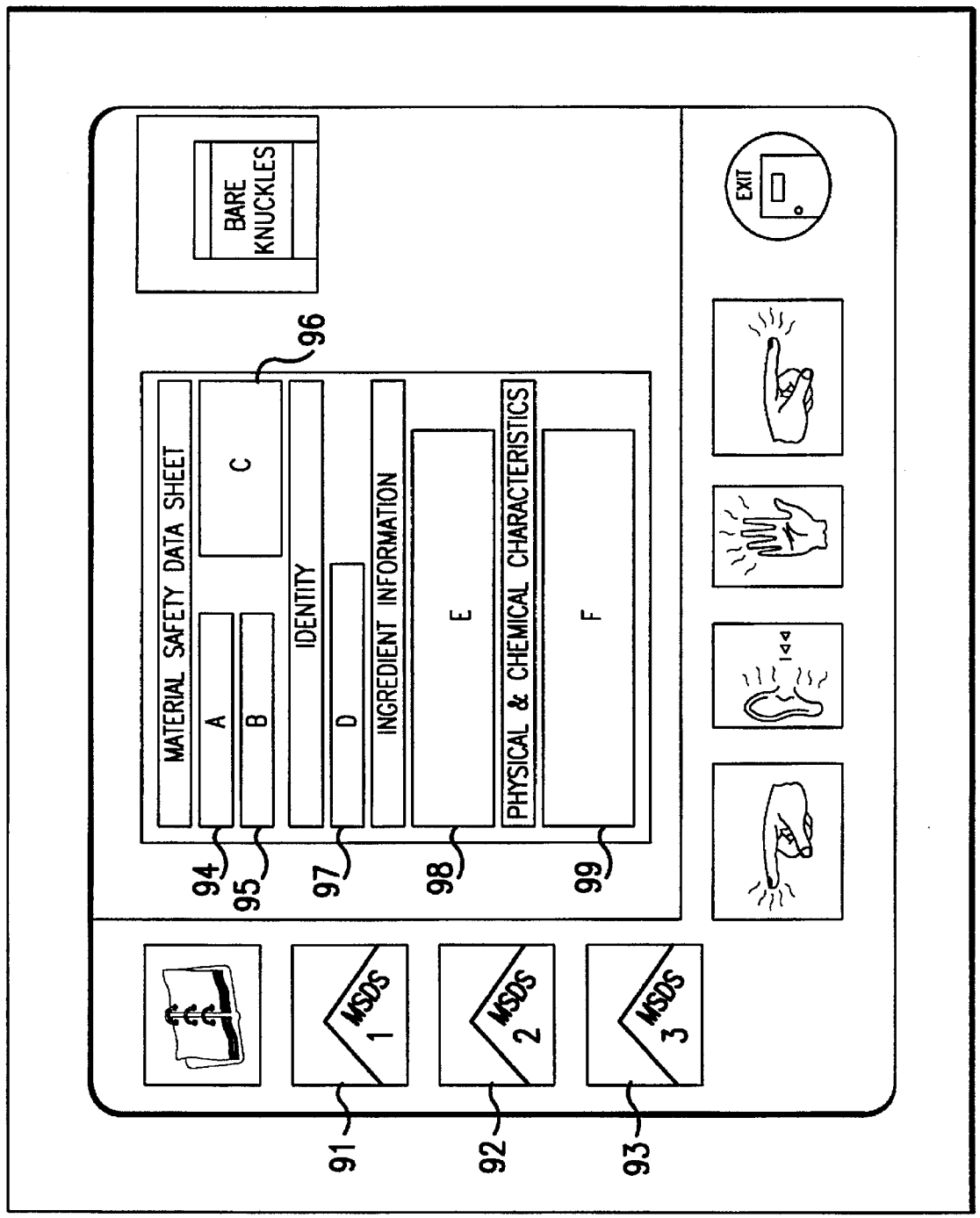
FIG. 7 shows a detailed single page MSDS screen.

If the user has chosen page 1 at step 305, control flows to step 306, where page 1 of the MSDS for the product Bare Knuckles Ultra Stripper is displayed (see FIG. 7). If the user has chosen page 2 at step 305, control flows to step 310 where page 2 of the MSDS for the product Bare Knuckles is displayed. Similarly, if the user has chosen page 3 at step 305, control flows to step 312 where page 3 would be displayed. At the far left hand side of the display of FIG. 7, icons 91, 92 and 93 are provided, to allow the user to quickly switch to a different page if desired, at anytime during the page 1 presentation. Also, it should be noted that the icon 91 is highlighted (see highlighting in FIG. 7) to indicate that page 1 of the MSDS is presently being accessed. The words "Click on any section of the MSDS to learn more about this product" are output through the speakers. The user can then click onto various parts of the displayed MSDS, such as 94, 95 and 96.

It can be seen that area 94 corresponds to area 1 of the printed MSDS shown in Table 1. Area 95 corresponds to area 2 of Table 1. Area 96 corresponds to area 3 of Table 1. By making such a direct correspondence between clickable areas of the displayed MSDS (FIG. 7) and the actual printed MSDS (Table 1), the user actually learns what type of information he/she can expect to find in a particular area of an MSDS. Therefore, if the user is later in a situation where he/she needs to consult an MSDS for another product and he/she is not near a computer, or the product has not yet had a Talking MSDS prepared for it, the user will quickly know where to look on the printed MSDS to find particular information. That is, the user has interactively learned that a particular location on a particular page of an MSDS contains particular information. Thus, the user will associate such information with that particular location on that particular page.

Figure 8:
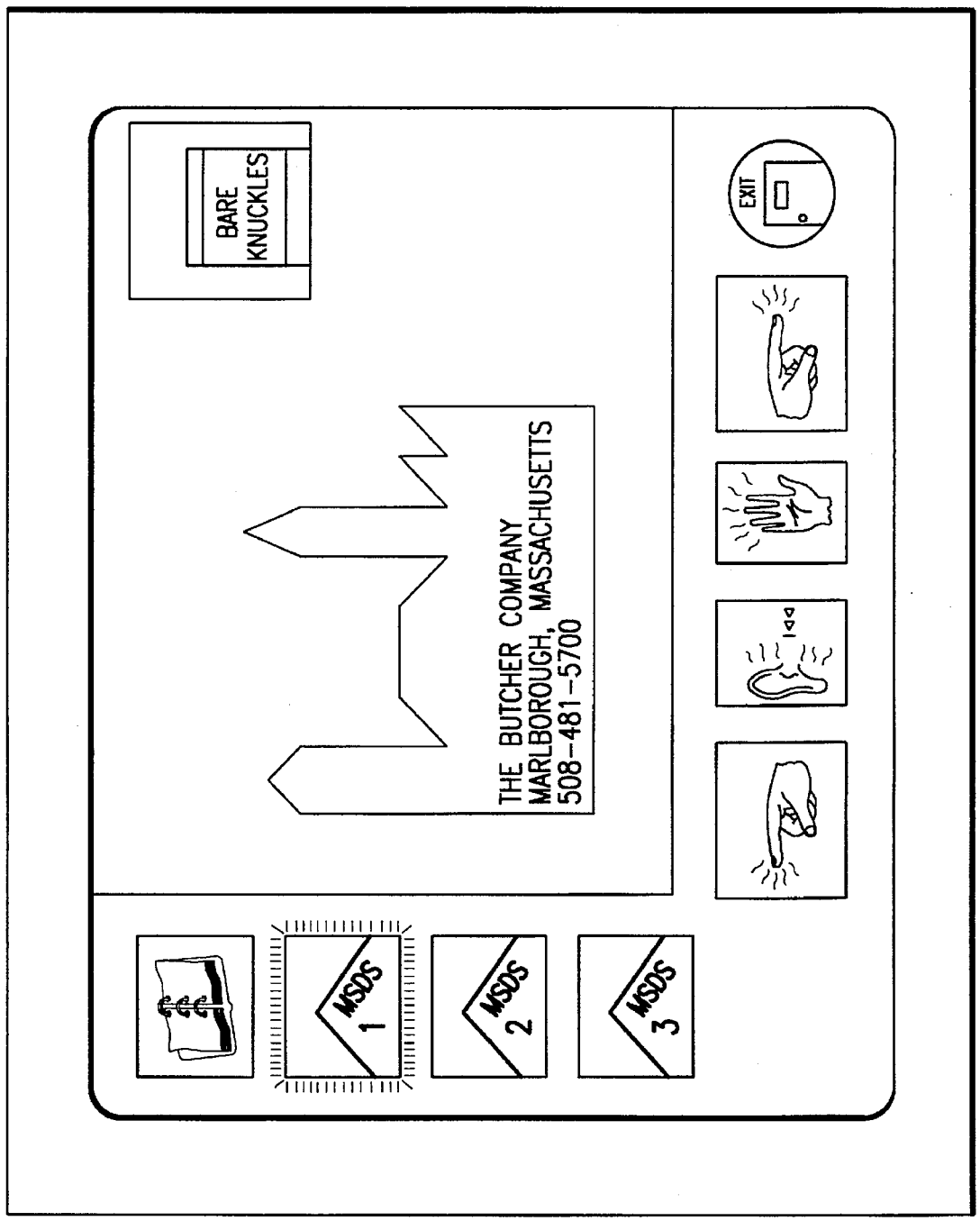
FIG. 8 shows a manufacturer information screen.

If the user clicks onto area 94 of FIG. 7, control flows to step 307 and the screen shown in FIG. 8 will be displayed, in which identifying information concerning the manufacturer of the product will be presented. The words "This product is manufactured by the Butcher Company in Marlborough, Mass. If you need further information, they can be reached at 508-481-5700." will be output through the speakers.

Figure 9:
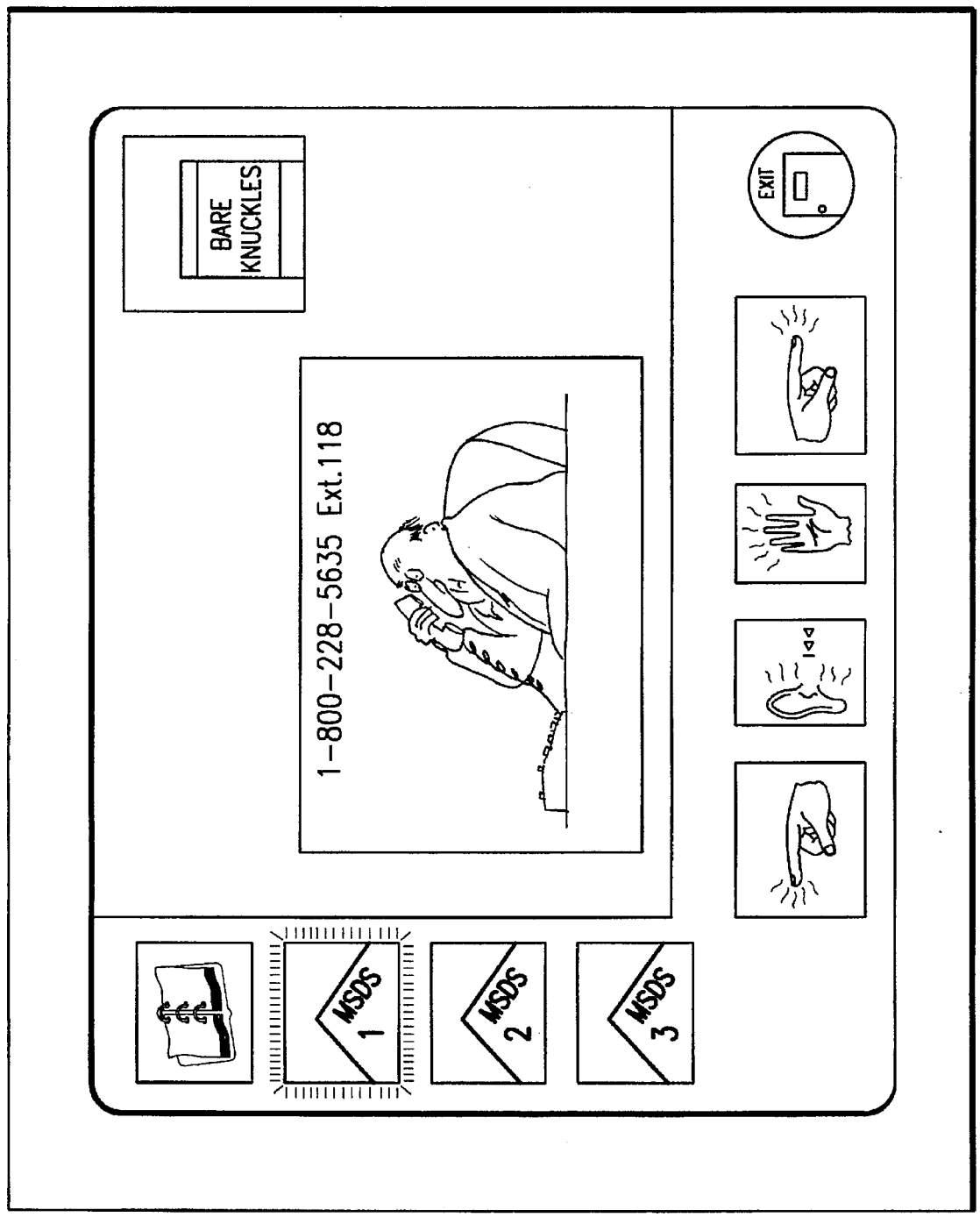
FIG. 9 shows an emergency information screen.

If the user clicks onto area 95 of FIG. 7, control flows to step 308 and the screen shown in FIG. 9 will be displayed, in which an emergency telephone number is given. The words "In case of an emergency, medical personnel may need more technical information, they can call 1-800-228-5635 ext. 118." will be output through the speakers.

If the user clicks onto area 96 of FIG. 7, control flows to step 309 and the screen shown in FIG. 10 will be displayed, in which the hazardous material identification system rating will be given and explained to the user. The words "This product has a hazardous material identification system health rating of 3. This means it can cause eye burns in concentrate form. Wear the appropriate personal protective equipment (PPE). For more information on PPE, see page 2 of this MSDS" will be output through the speakers. Also, because of the need to wear protective goggles and gloves, pictures of goggles and gloves will be shown in the display of FIG. 10 as shown at icon 124.

Figure 10:
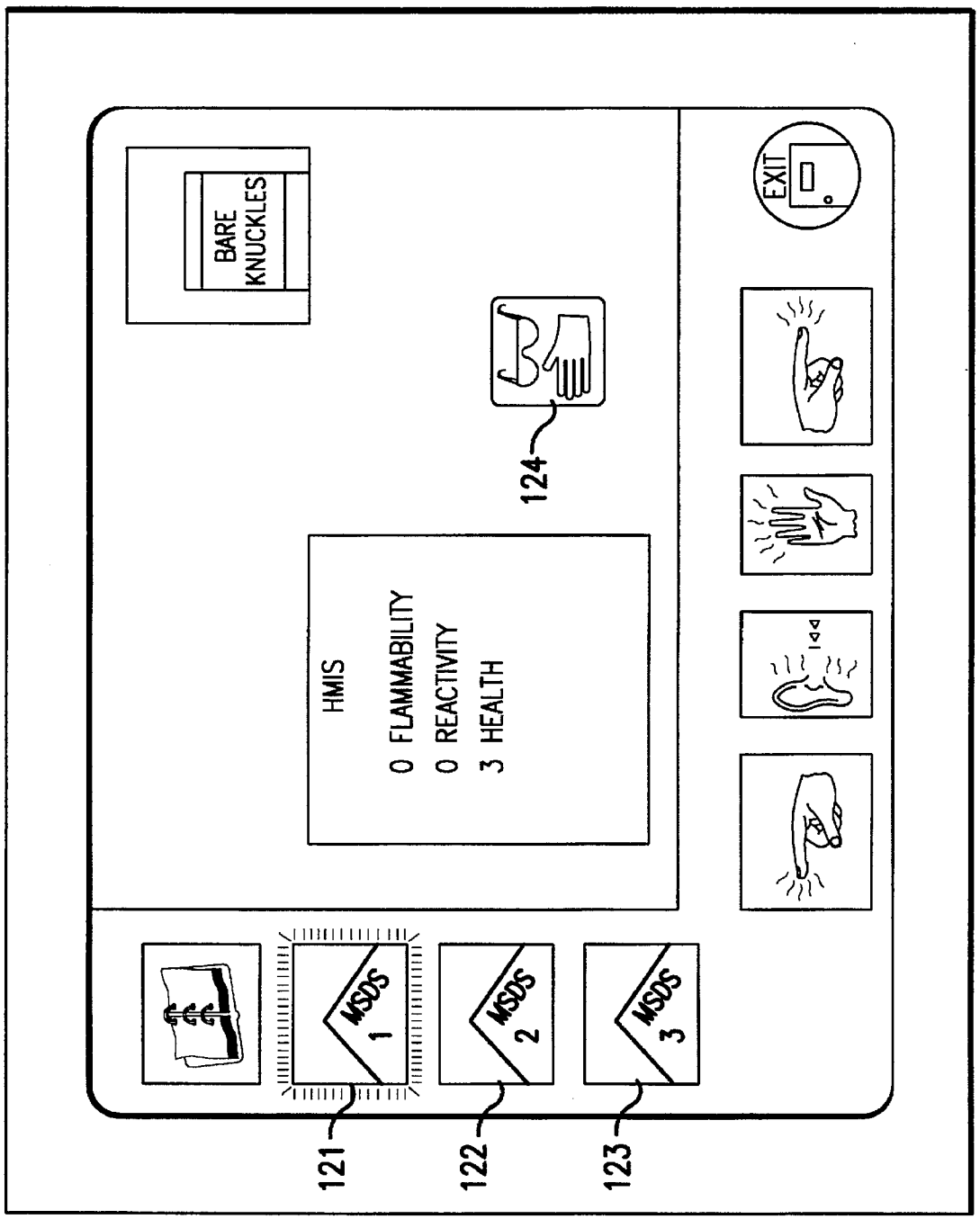
FIG. 10 shows an HMIS rating screen.

The advantages of quick random access to various pages of the MSDS as a learning tool can be especially seen with respect to the last given example of FIG. 10. The user, who is presently learning about page 1, is instructed that personal protective equipment (PPE) will be explained later on page 2. If the user desires, he/she can immediately go to page 2 and learn about such protective equipment by clicking onto the page 2 icon 122 located at the far left hand side of FIG. 10.

In a similar fashion, if the user clicks onto icons 97, 98 or 99 of the page 1 MSDS display of FIG. 7, control will flow to steps 311, 313 or 314, respectively.

If the user clicks onto icon 97, at step 311, a photograph of the product container is displayed and the words "The name of this product is Bare Knuckles" is output through the speakers.

If the user clicks onto icon 98, at step 313, a graphic of the ingredient section of the MSDS would be displayed. The words "These are the components of this product. If you have questions about this section, see your supervisor." are output through the speakers.

If the user clicks onto icon 99, at step 314, graphics are displayed illustrating the actual physical and chemical characteristics section of each MSDS with an illustration of a bottle filled with red liquid and a nonflammable symbol. The words "This product is a clear red liquid with an ammonia odor and it is not flammable." are output through the speakers.

In a similar manner, when the other pages of the MSDS are chosen, the user will be informed of corresponding information concerning these pages.

At any time during the execution of the above steps, the user can choose to change to a different page of the MSDS for the current product being examined, by simply clicking on the constantly displayed icons (e.g., 91, 92 and 93 of FIG. 7) on the far left side of each screen.

Also, at any time during the execution of the above steps, the user can choose to change to a completely different product by clicking on the constantly displayed icon (51 in FIG. 5) at the top.

Because of such flexibility, the user can specifically tailor the instruction he/she receives to his/her particular needs. Much time can be saved because there is no need for the user to "sit through" information that the he/she already knows. On the other hand, information that is not so familiar or is particularly difficult to understand for a particular user can be repeated until it is understood.

Also, because of the ease in switching between different products and different MSDS pages, if a user wants to learn about, for example, only the physical and chemical characteristics about each of the products the user needs to use that day, he/she can easily choose for each product page 1 of the MSDS and then click on icon 99. Such flexibility and control in the instructional method was totally lacking in the prior art linear progression instructional method discussed above.

The user can also select the language which he/she wishes to be instructed in. Then, the sound card will deliver speech in the manner discussed above, in the selected language.

The spirit and scope of the present invention is not to be limited by the physical embodiments discussed above but only by the appended claims.

What is claimed is:

1. An instructional method for instructing a user of chemical products as to information contained in a material safety data sheet, MSDS, for each product, the method comprising the steps of:

(a) displaying a product list of various chemical products on a display screen of a computer system;

(b) allowing the user to select, using a mouse, in a random access fashion, one of the products on the displayed product list; and (c) displaying an MSDS and a plurality of graphical icons, each icon representing a different page thereof for the selected product, by clicking the mouse to cause a selection of the MSDS for a product; and (d) displaying a particular page of the MSDS by the user clicking on to one of the graphical icons representing the pages of the MSDS by using a mouse.

2. The method of claim 1 wherein the instructional method is performed using a computer equipped with multimedia capability.

3. The method of claim 2 further excluding the step of allowing the user to select a language in which audio information concerning the MSDS is presented.

4. The method of claim 2 in which the multimedia capability includes the presentation of speech.

5. The method of claim 1 wherein the user can switch to a different page of the displayed MSDS at anytime during the method by clicking the mouse when a graphical presentation representing the mouse is positioned on a particular graphical icon.

6. The method of claim 1 further including the step of:

(d) allowing the user to select a portion of the displayed MSDS in a random access fashion in order to learn about that portion.

7. The method of claim 1 wherein anytime during the method, the user can return to step (a) to select a different product from the product list by clicking on to a screen displayed graphical icon displayed to the user.

8. The method of claim 1 wherein the page of the displayed MSDS is displayed at least partially as discrete blocks of fenced in information concerning the product and its use and wherein the information from each displayed block of information is displayed by the user absent the other blocks by clicking a mouse on a discrete block of said blocks of information.

9. An instructional method for instructing users of chemical products as to information contained in a material safety data sheet, MSDS for each product, the method comprising the steps of:

(a) displaying a product list of various chemical products;

(b) allowing the user to select by selecting a displayed graphical icon one of the many products on the displayed product list in a random access fashion;

(c) displaying an MSDS for the selected product and graphical icons each representing a different page of said MSDS; and (d) allowing the user to select a language in which audio portions describing the MSDS are presented.

10. An instructional apparatus for instructing users of chemical products as to information contained in a material safety data sheet, MSDS, for each product, the apparatus comprising:

(a) first means for displaying a product list of various chemical products to a user;

(b) second means including a mouse for permitting a user to select, in a random access manner, one of the products on the product list displayed by said first means; and (c) third means responsive to said second means for displaying an MSDS and graphical icons, each icon representing the different pages thereof for the selected product.

11. The apparatus of claim 10, wherein said third means includes speech presentation is a language pre-selected by the user.

* * * * *